United States Patent
Hu et al.

(10) Patent No.: US 7,769,120 B2
(45) Date of Patent: Aug. 3, 2010

(54) DYNAMICALLY ADJUSTING SYNC WINDOWS

(76) Inventors: Jay Hu, 8F, No. 533, Chung-Cheng Rd., Hsin-Tien, Taipei (TW); Mel Lai, 8F, No. 533, Chung-Cheng Rd., Hsin-Tien, Taipei (TW); Shih-Lung Ouyang, 8F, No. 533, Chung-Cheng Rd., Hsin-Tien, Taipei (TW)

(*) Notice: Subject to any disclaimer, the term of this patent is extended or adjusted under 35 U.S.C. 154(b) by 790 days.

(21) Appl. No.: 11/021,679

(22) Filed: Dec. 21, 2004

(65) Prior Publication Data

US 2005/0157606 A1   Jul. 21, 2005

(30) Foreign Application Priority Data

Jan. 20, 2004   (TW) .............................. 93101443 A (51) Int. Cl.
*H04L 7/00* (2006.01)

(52) U.S. Cl. ........................ 375/368; 375/365; 375/357; 375/371; 375/366; 348/525; 348/526; 370/509; 370/512; 370/514

(58) Field of Classification Search ................. 348/525, 348/526; 375/365, 368, 357, 371, 366; 370/509, 370/512, 514
See application file for complete search history.

(56) References Cited

U.S. PATENT DOCUMENTS

| | | | |
|---|---|---|---|
| 4,390,781 A | 6/1983 | Musha | |
| 4,512,004 A | 4/1985 | Nonaka et al. | |
| 4,707,648 A | 11/1987 | Minami | |
| 4,707,816 A | 11/1987 | Yonezawa et al. | |
| 4,730,290 A | 3/1988 | Takasago et al. | |
| 4,878,211 A | 10/1989 | Suzuki et al. | |
| 5,029,155 A | 7/1991 | Kenjo et al. | |
| 5,146,443 A | 9/1992 | Iwase et al. | |
| 5,199,015 A * | 3/1993 | Edahiro et al. ........... 369/44.25 |
| 5,216,659 A | 6/1993 | Call et al. | |
| 5,245,598 A | 9/1993 | Burroughs | |
| 5,297,114 A | 3/1994 | Itoh et al. | |
| 5,367,513 A | 11/1994 | Bates et al. | |
| 5,475,664 A | 12/1995 | Shimizume et al. | |

(Continued)

FOREIGN PATENT DOCUMENTS

CN   1407552   4/2003

(Continued)

OTHER PUBLICATIONS

U.S. Appl. No. 12/604,307, filed Oct. 22, 2009, Tsai et al.
Machine Transation of Okamatsu, JP-10-083540, published Mar. 31, 1998.
First Office Action, Application No. TW 93135312 Filed. Nov. 17, 2004: Date of Mailing: Feb. 18, 2009, 3 pages [translation attached].

(Continued)

*Primary Examiner*—Chieh M Fan
*Assistant Examiner*—Siu M Lee
(74) *Attorney, Agent, or Firm*—Perkins Coie LLP (57) ABSTRACT

Methods and apparatuses for dynamically adjusting sync windows are described. A default sync window is set; a data signal is input; detecting if parts of the data signal within the sync window form a sync pattern; accumulating a count of the sync pattern within and without the sync window; and reducing the sync window when the count of sync pattern within the sync window achieves a first threshold value, and increasing the sync window when the count of the sync pattern outside the sync window achieves a second threshold value.

17 Claims, 6 Drawing Sheets

U.S. PATENT DOCUMENTS

| | | | |
|---|---|---|---|
| 5,504,726 A | | 4/1996 | Semba |
| 5,563,920 A | * | 10/1996 | Fimoff et al. ............... 375/354 |
| 5,568,464 A | | 10/1996 | Horie |
| 5,587,985 A | | 12/1996 | Sano et al. |
| 5,602,814 A | | 2/1997 | Jaquette et al. |
| 5,623,465 A | | 4/1997 | Sasaki et al. |
| 5,642,340 A | | 6/1997 | Nomura |
| 5,677,935 A | * | 10/1997 | Karino ....................... 375/368 |
| 5,703,848 A | | 12/1997 | Hofer |
| 5,710,748 A | | 1/1998 | Hofer |
| 5,732,052 A | | 3/1998 | Ando et al. |
| 5,748,584 A | | 5/1998 | Maezawa |
| 5,844,920 A | | 12/1998 | Zook et al. |
| 6,069,667 A | * | 5/2000 | Ueda et al. .................. 348/525 |
| 6,069,855 A | | 5/2000 | Fuma et al. |
| 6,157,601 A | | 12/2000 | Kao et al. |
| 6,269,058 B1 | * | 7/2001 | Yamanoi et al. ......... 369/47.28 |
| 6,404,713 B1 | | 6/2002 | Ueki |
| 6,560,173 B2 | | 5/2003 | Shimamura et al. |
| 6,611,123 B2 | | 8/2003 | Ono |
| 6,628,594 B1 | | 9/2003 | Park |
| 6,633,523 B1 | | 10/2003 | Masaki et al. |
| 6,691,203 B1 | * | 2/2004 | Chen et al. ..................... 711/4 |
| 6,731,624 B1 | * | 5/2004 | Maekawa et al. ........... 370/350 |
| 6,745,167 B2 | | 6/2004 | Sun |
| 6,757,239 B2 | * | 6/2004 | Minamino et al. ....... 369/275.4 |
| 6,882,611 B2 | | 4/2005 | Chen |
| 6,906,986 B2 | | 6/2005 | Lee et al. |
| 6,934,227 B2 | | 8/2005 | Nakata et al. |
| 6,970,522 B1 | | 11/2005 | Morling et al. |
| 7,035,176 B2 | | 4/2006 | Tsai |
| 7,092,324 B2 | | 8/2006 | Koh |
| 7,095,693 B2 | | 8/2006 | Sasaki et al. |
| 7,120,100 B2 | | 10/2006 | Hung et al. |
| 7,149,169 B2 | | 12/2006 | Juan et al. |
| 7,242,650 B2 | | 7/2007 | Tsai et al. |
| 7,245,573 B2 | * | 7/2007 | Eom ........................ 369/53.34 |
| 7,286,462 B2 | | 10/2007 | Tsai et al. |
| 7,298,674 B2 | | 11/2007 | Lai et al. |
| 7,349,310 B2 | | 3/2008 | Chen et al. |
| 7,385,896 B2 | | 6/2008 | Lai et al. |
| 7,542,390 B2 | | 6/2009 | Ouyang et al. |
| 7,619,956 B2 | | 11/2009 | Tsai |
| 7,646,682 B2 | | 1/2010 | Lei et al. |
| 2001/0019603 A1 | | 9/2001 | McMahon |
| 2002/0009026 A1 | | 1/2002 | Shimamura et al. |
| 2002/0131350 A1 | | 9/2002 | Kurobe et al. |
| 2003/0048707 A1 | | 3/2003 | Ono |
| 2003/0053387 A1 | | 3/2003 | Lee et al. |
| 2003/0147315 A1 | | 8/2003 | Iwazawa et al. |
| 2003/0169649 A1 | | 9/2003 | Takaoka et al. |
| 2004/0037177 A1 | | 2/2004 | Buchler |
| 2004/0052183 A1 | | 3/2004 | Yu et al. |
| 2004/0130993 A1 | | 7/2004 | Nadershahi |
| 2004/0179451 A1 | | 9/2004 | Morishima et al. |
| 2005/0195717 A1 | | 9/2005 | Lai et al. |
| 2005/0251671 A1 | | 11/2005 | Ouyang et al. |
| 2006/0013083 A1 | | 1/2006 | Koh |
| 2006/0039252 A1 | | 2/2006 | Chu |
| 2006/0056555 A1 | * | 3/2006 | Oono et al. .................. 375/354 |
| 2007/0237044 A1 | | 10/2007 | Jin et al. |
| 2008/0205240 A1 | | 8/2008 | Lai et al. |
| 2009/0003163 A1 | | 1/2009 | Chen et al. |

FOREIGN PATENT DOCUMENTS

| | | |
|---|---|---|
| CN | 1481553 | 3/2004 |
| CN | 1619660 | 5/2005 |
| CN | 1619661 | 5/2005 |
| CN | 1619662 | 5/2005 |
| CN | 1619667 | 5/2005 |
| CN | 1619668 | 5/2005 |
| CN | 1629947 | 6/2005 |
| JP | 10040546 | 2/1998 |
| JP | 10083540 | 3/1998 |
| JP | 63117336 | 5/1998 |
| JP | 2001067682 | 3/2001 |
| TW | 200518049 | 6/2005 |
| TW | 200518073 | 6/2005 |
| TW | 200518078 | 6/2005 |
| TW | 200518081 | 6/2005 |
| TW | 200522040 | 7/2005 |
| TW | 200518048 | 12/2006 |
| WO | WO-02/49023 | 6/2002 |

OTHER PUBLICATIONS

Notice of Allowance, U.S. Appl. No. 10/990,665; Mailed Jan. 29, 2008; 6 pages.

Non-Final Office Action: U.S. Appl. No. 10/990,665; Mailed Jul. 17, 2007; 21 pages.

Final Office Action; U.S. Appl. No. 10/990,666; Mailed Oct. 2, 2007; 10 pages.

Non Final Office Action; U.S. Appl. No. 10/990,860; Mailed Jul. 30, 2007; 9 pages.

Final Office Action; U.S. Appl. No. 10/990,860; Mailed Oct. 17, 2007; 8 pages.

Non-Final Office Action; U.S. Appl. No. 10/990,860; Mailed Feb. 11, 2008; 11 pages.

Final Office Action; U.S. Appl. No. 10/990,860; Mailed Jul. 16, 2008; 7 pages.

Non-Final Office Action; U.S. Appl. No. 10/990,860; Mailed Dec. 9, 2008 9 pages.

Non-Final Office Action; U.S. Appl. No. 10/990,860; Mailed Apr. 17, 2009; 10 pages.

Notice of Allowance for U.S. Appl. No. 10/990,860; Mailed Sep. 10, 2009; 5 pages.

Final Rejection; CN Application No. 2004100683527 filed Aug. 31, 2004; Applicant: Via Technologies, Inc., Date of Issue Sep. 4, 2009; 13 pages.

Notice of Allowance; U.S. Appl. No. 10/990,655; Mailed Apr. 2, 2008; 10 pages.

Notice of Allowance; U.S. Appl. No. 10/990,655; Mailed Jul. 24, 2008; 7 pages.

Notice of Allowance; U.S. Appl. No. 10/990,655; Mailed Dec. 23, 2008; 8 pages.

Notice of Allowance; U.S. Appl. No. 10/990,655; Mailed Jun. 11, 2009; 9 pages.

Notice of Allowance; U.S. Appl. No. 10/990,669; Mailed Sep. 20, 2007; 4 pages.

Ex Parte Quayle Office Action; U.S. Appl. No. 10/990,669; Mailed Jul. 13, 2007, 6 pages.

Notice of Allowance; U.S. Appl. No. 10/990,805; Mailed Oct. 26, 2007; 4 pages.

Ex Parte Quayle Office Action; U.S. Appl. No. 10/990,805, Mailed Jul. 24. 2007; 7 pages.

Notice of Allowance; U.S. Appl. No. 10/990,909; Mailed Aug. 15, 2007; (9 pgs.).

Notice of Allowance; U.S. Appl. No. 12/021,239; Mailed Dec. 16, 2009; 7 pages.

Non-Final Office Action; U.S. Appl. No. 11/205,260; Mailed Apr. 6, 2009; 8 pages.

Non-Final Office Action; U.S. Appl. No. 11/205,260; Mailed Aug. 31, 2009; 8 pages.

Notice of Allowance; U.S. Appl. No. 10/907,859; Mailed Jan. 27, 2009, 6 pages.

Notice of Allowance; U.S. Appl. No. 10/907,859; Mailed Sep. 9, 2008; 7 pages.

Non-Final Office Action; U.S. Appl. No. 12/111,933; Mailed Feb. 24, 2010, 7 pages.

* cited by examiner

DYNAMICALLY ADJUSTING SYNC WINDOWS

CROSS-REFERENCE TO RELATED APPLICATIONS

This application claims priority to Taiwanese Application Ser. No. 093101443, filed on Jan. 20, 2004, and entitled "APPARATUS AND METHOD OF DYNAMIC ADJUSTING THE SYNC WINDOW," which is hereby incorporated herein in its entirety by reference.

BACKGROUND OF THE INVENTION

1. Field of the Invention

The present invention generally relates to an apparatus and method for optical drive searching, and more particularly to an apparatus and method for an optical drive searching sync pattern.

2. Description of the Prior Art

As optical storing media is further introduced, storing a large amount of data is not as difficult. And since storing data within an optical media in a digital form is better than that in traditional magnetic media recorded in analog form, the data signal can keep longer and will not distort over time.

Philips and Sony set up the earliest standard of the optical media in 1980 (RED BOOK). In order to store different data content, a lot of different standards (such as: YELLOW BOOK, ORANGE BOOK . . . etc.) are established. However, the optical media data formats are almost all the same and most of them are extended based on the earliest standard, the RED BOOK.

Taking a compact disc (CD) as an example of: at first, data signal is modulated by non-return to zero, NRZ (also called eight to fourteen modulations, EFM). Then the data is stored into a compact disc (CD). For 24 bytes data signal, the data is in form of 588 channel bits after EFM. Since EFM is based on clock, T, the data can be rewritten in 588T. Every 588T includes:

Sync pattern: 24+3 unit: channel bits
Control byte: 14+3
Data byte:12*(14+3)
Error correction: 4*(14+3)
Data byte: 12*(14+3)
Error correction: 4*(14+3)

Figure 1A:
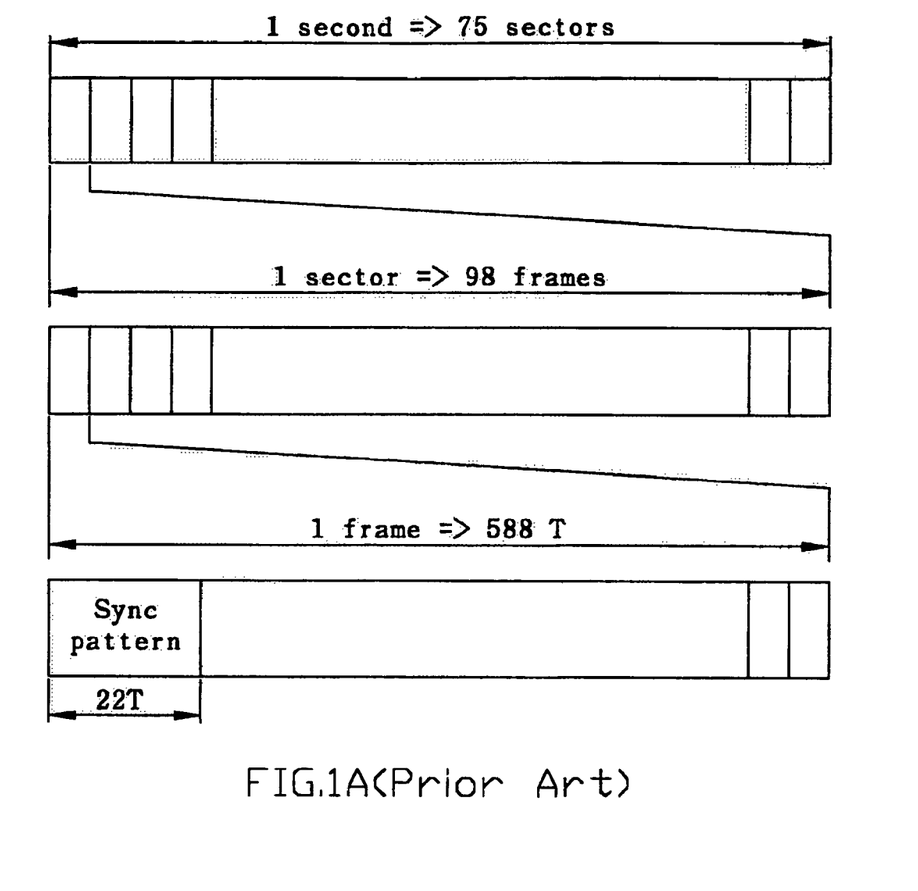
FIG. 1A shows a schematic diagram illustrating the data signal of the optical disc.

Every 588T forms a frame. In a compact disc, every sector has 98 frames and every 75 sector forms a second data signal (as shown in FIG. 1A).

Similarly, for digital versatile disc (DVD), the data signal is modulated by EFM plus. The data signal is in form of 1488T of a frame, and then the data signal is stored into a digital versatile disc (DVD).

After modulated by EFM, data signal forms different pits long from 3T to 11T. And these nine different length pits (known as pit and land) forms a spiral groove. The optical drive determines and reads the data signal according to the reflection of pits of the spiral groove.

Figure 1B:
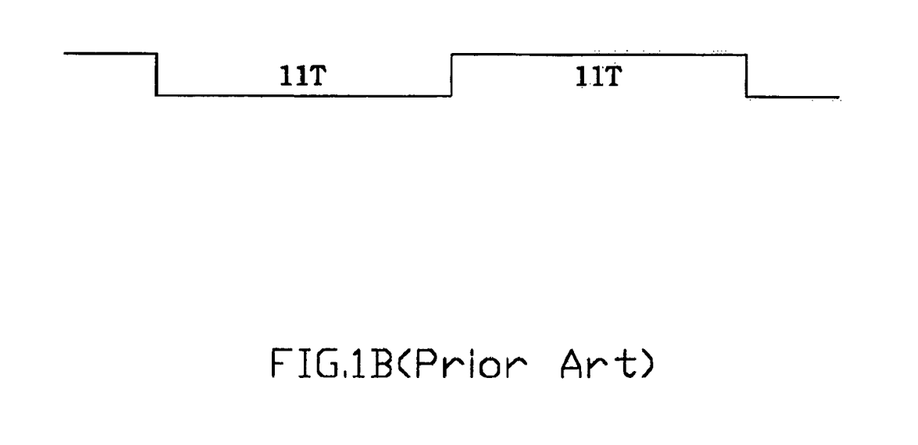
FIG. 1B shows a schematic diagram illustrating the sync pattern of the optical disc.

According to the previous said, the data format of an optical disc, it is understood that every frame has a group of 24 bits sync pattern for separating every frame. By the sync pattern, the optical drive determines every frame range and finds and reads the data signal quickly and correctly. For the compact disc (CD), the sync pattern is formed in 11T/11T and exists in every 588T data signal (as shown in FIG. 1B). And for the digital versatile disc (DVD), the sync pattern is formed in 14T/4T and exists in every 1488T data signal.

Figure 2:
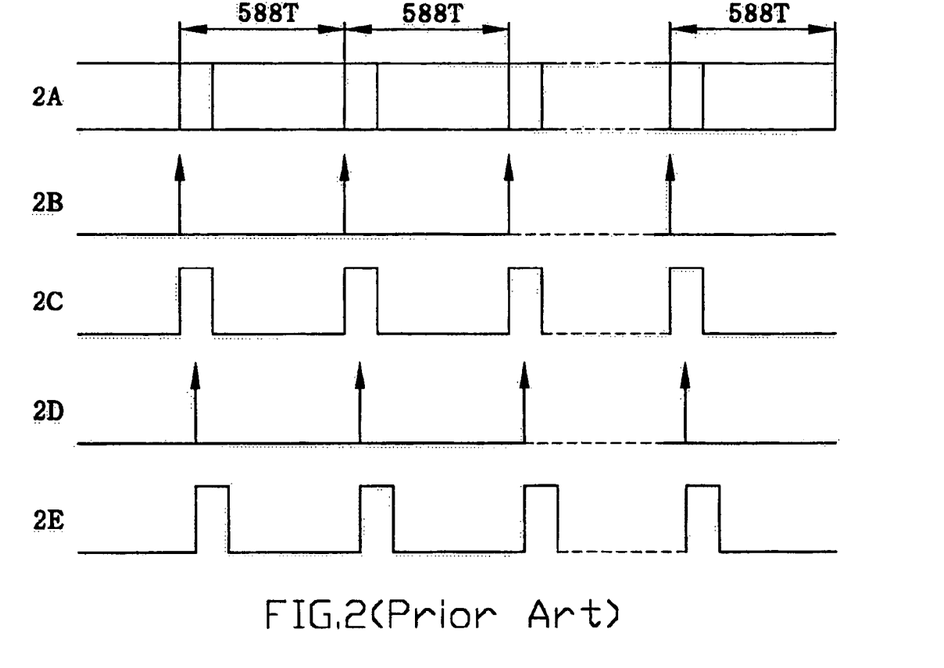
FIG. 2 shows a schematic diagram illustrating the timing sequence when optical drive reads disc data signal.
Figure 3:
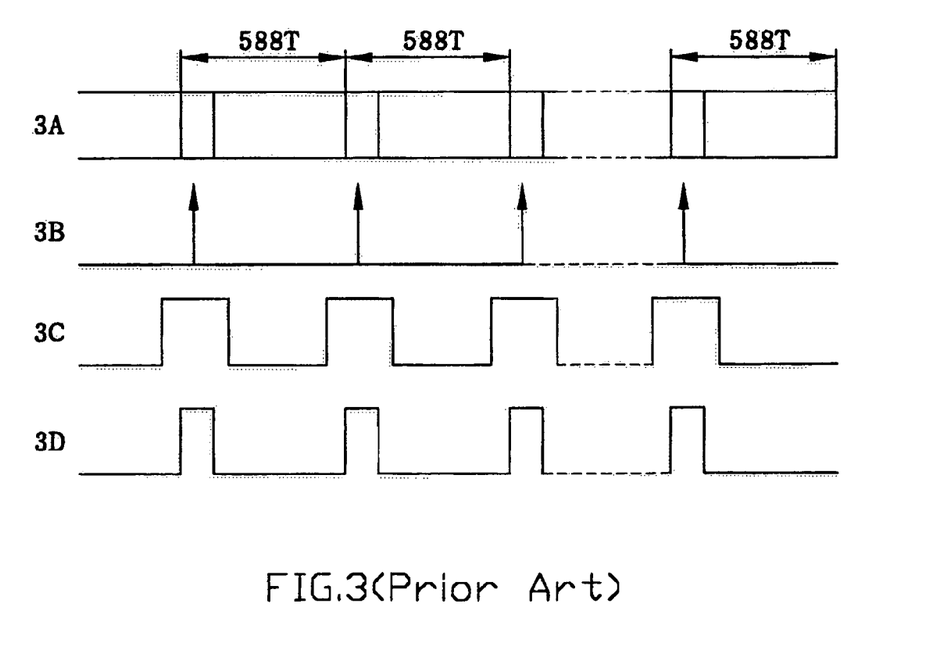
FIG. 3 shows a schematic diagram illustrating the timing sequence when optical drive generates sync window for detecting the sync pattern.

Referring to FIG. 2, the symbol 2A is shown as the frame signals in the optical disc. When an optical drive reads a disc, it produces the sync found 2B. When the sync found 2B and the sync pattern of the frame signal occurs at the same time, the optical drive generates the sync flag 2C for highlighting the position of the sync pattern. However, the rotational speed of the optical drive is different when reading the outer circle and the inner circle of the disc. Therefore, the timing of the actual sync found (such as: 2D) and the timing of the sync pattern occurs at different timing and a jitter is generated, so as the optical drive generating the sync flag for labeling the sync pattern is inaccuracy. (As shown in FIG. 3) In order to solve this problem, setting a W width sync window 3C (about 30T) tolerates the error between the sync found 3B and the sync pattern 3A. So if the optical drive can detect the sync pattern within the sync window, it can generate the sync flag 3D and read the data signal correctly.

As the sync window is fixed, when the optical disc has been scraped, the optical drive cannot detect the sync pattern correctly and it can be a problem for reading the data signal.

Figure 4:
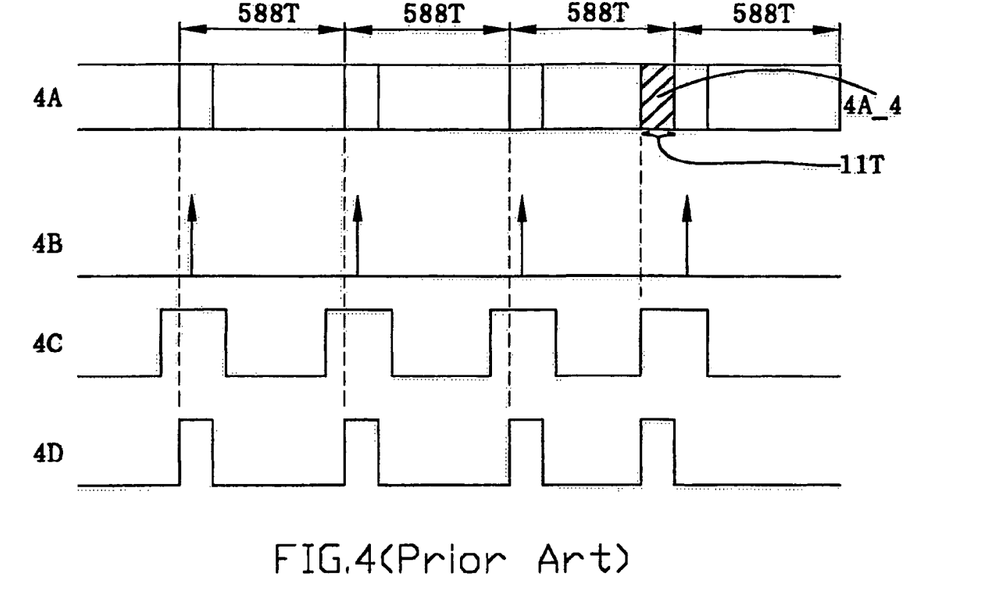
FIG. 4 shows a schematic diagram illustrating that the optical drive detects the wrong sync pattern.

For example: the optical drive reads a disc as shown in FIG. 4. When the disc is scraped or stained, it generates an 11T signal before the position of the sync pattern occurs. Therefore, the signal includes the sync pattern as 11T/11T/11T (as shown in 4A_4). If the sync window has a large window range, the optical drive can misjudge the first half 11T/11T of the 11T/11T/11T as the sync pattern. It generates the wrong sync flag 4C. As the result, It cannot read the correct data signal and cannot detect the following sync pattern. Furthermore, if the sync window has a small window range, the frequency of the phase lock loop, PLL will be floating and tolerates the error between the sync pattern and the sync flag will be decreased. As a consequence, it cannot lock the sync pattern correctly.

SUMMARY OF THE INVENTION

The invention provides a method and a system of dynamic adjusting for the sync window. The method and system according to the condition adjusts the sync window range for the optical drive correctly detecting the sync pattern.

The apparatus of dynamically adjusting the sync window of the present invention includes: a buffer for storing an input data; a sync window generator for generating a sync window; a sync pattern detection circuit for detecting if the input data having any sync pattern showing in the sync window; a first counter for accumulating times of the sync pattern found within the sync window; a second counter for accumulating times of the sync pattern found outside the sync window; and an adjusting circuit for adjusting the range of the sync window when the accumulative values of the first or the second counter achieves the threshold.

The method of dynamic adjusting the sync window in the present invention including: setting a default sync window; inputting the data signal one at a time; detecting if parts of the data signal within the sync window is a sync pattern; accumulating times of the sync pattern within and without the sync window; and reducing the sync window when times of the sync pattern within the sync window achieve one threshold value, and increasing the sync window when times of the sync pattern outside the sync window achieve another threshold value.

DESCRIPTION OF THE PREFERRED EMBODIMENTS

The invention provides a method and an apparatus of dynamically adjusting the sync window. For the optical drive detecting the sync pattern, the scraped disc or stained disc does not affect the optical drive and furthermore it does not read the wrong data signal. Some of the embodiments of the invention will describe in detail and clearly as follows. However, except for the detailed description, the invention can widely apply in others. And the true scope of the invention is not limited here but the claims.

Figure 5:
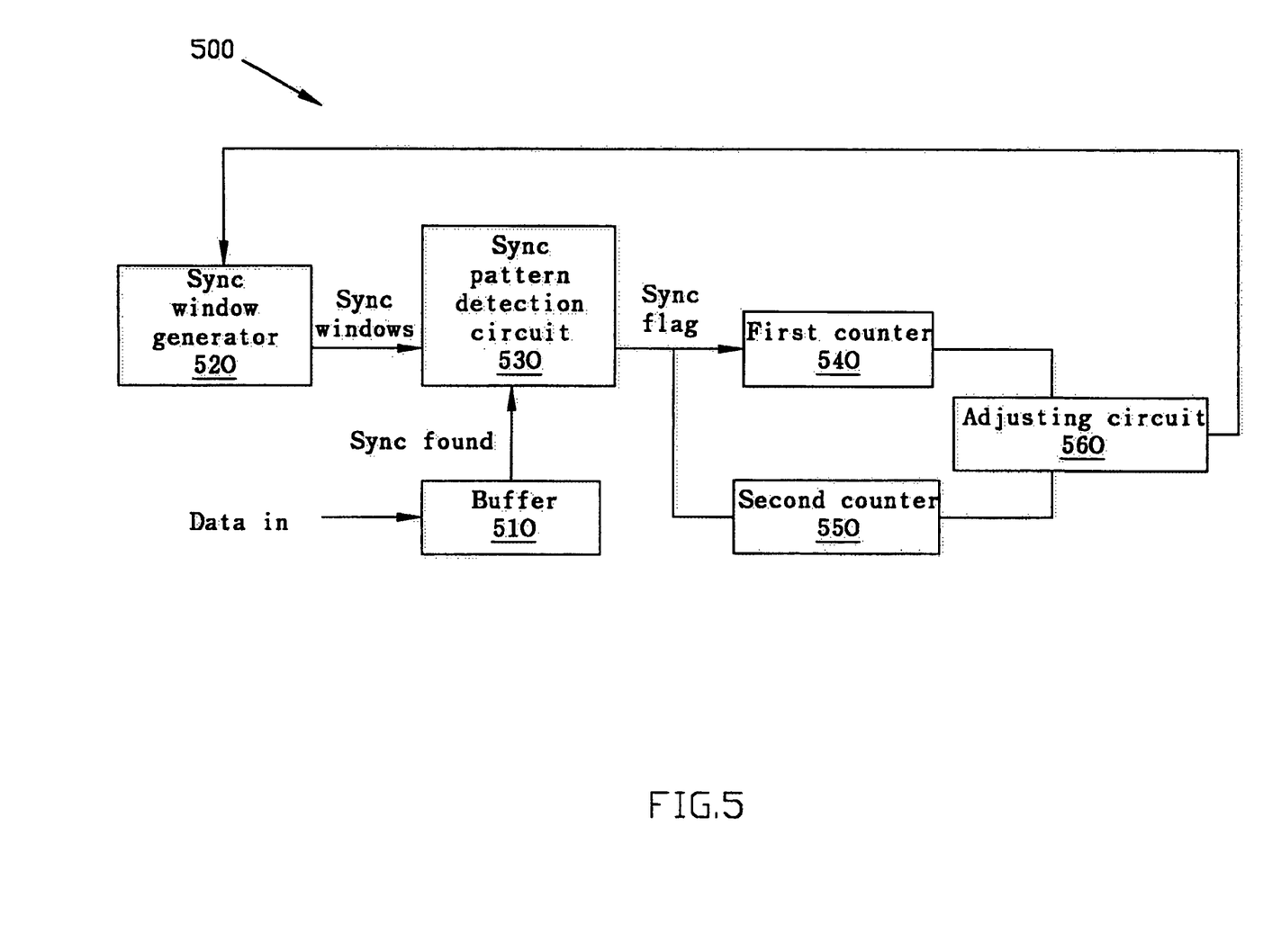
FIG. 5 shows a schematic block diagram illustrating the apparatus of dynamic adjusting the sync window.

FIG. 5 shows the apparatus for dynamic adjusting sync window 500 of the invention. It includes: a buffer 510 for storing the inputting data signal; a sync window generator 520 for generating a sync window; a sync pattern detection circuit 530 connecting to the sync window generator 520 for detecting the sync pattern when the data signal occurs in the sync window; a first counter 540 connecting to the sync pattern detection circuit 530 for accumulating the numbers of the sync pattern occurring in the sync window; a second counter 550 connecting to the sync pattern detection circuit 530 for accumulating the numbers of the sync pattern occurring out of the sync window; and an adjusting circuit 560 separately inputting from the first counter 540 and the second counter 550 and outputting to the sync window generator 520 for adjusting the sync window range when the first counter 540 and the second counter 550 achieving the threshold.

As shown in FIG. 5, the buffer 510, the sync window generator 520, and the sync pattern detection circuit 530 are the apparatus, which is used to search the sync pattern in a general optical drive. However, the invention uses the first counter 540 and the second counter 550 for counting the numbers of the sync pattern occurring in the predefined sync window and the numbers of the sync pattern occurring out of the predefined sync window. And then using an adjusting circuit 560 dynamically adjusts the sync window range, wherein the adjusting circuit 560 may include a multiplexer with different range sync windows, which are separate according to the calculating result of the first counter 540 and the second counter 550 for choosing one of the sync windows. In other words, the adjusting circuit 560 can be called a calculating circuit. It is according to the calculating result of the first counter 540 and the second counter 550 to reduce or enlarge the predefined sync window.

The method for the dynamic adjusting sync window of the invention is disclosed herein. The sync window generator 520 predefines a sync window with length W; wherein the sync window has the range W which is bigger than the sync pattern. At the same time, when a data signal input to the buffer 510 and the pulse of the sync found is triggered, the sync pattern detection circuit 530 detects if there has sync pattern occurred within the detecting range W of the sync window. If yes, the first counter 540 accumulates the numbers of the sync pattern occurring in the sync window (the first accumulating number CNT1); if no, the second counter 550 accumulates the numbers of the sync pattern occurring out of the sync window (the second accumulating number CNT2). Herein, when the CNT1 achieves the first threshold, the system reduces the range W of the sync window for detecting the next inputting data signal and resets the CNT1 of the first counter to zero. Otherwise, when the CNT2 achieves the second threshold, the system increases the range W of the sync window for detecting the next inputting data signal and resets the CNT2 of the second counter to zero.

Figure 6:
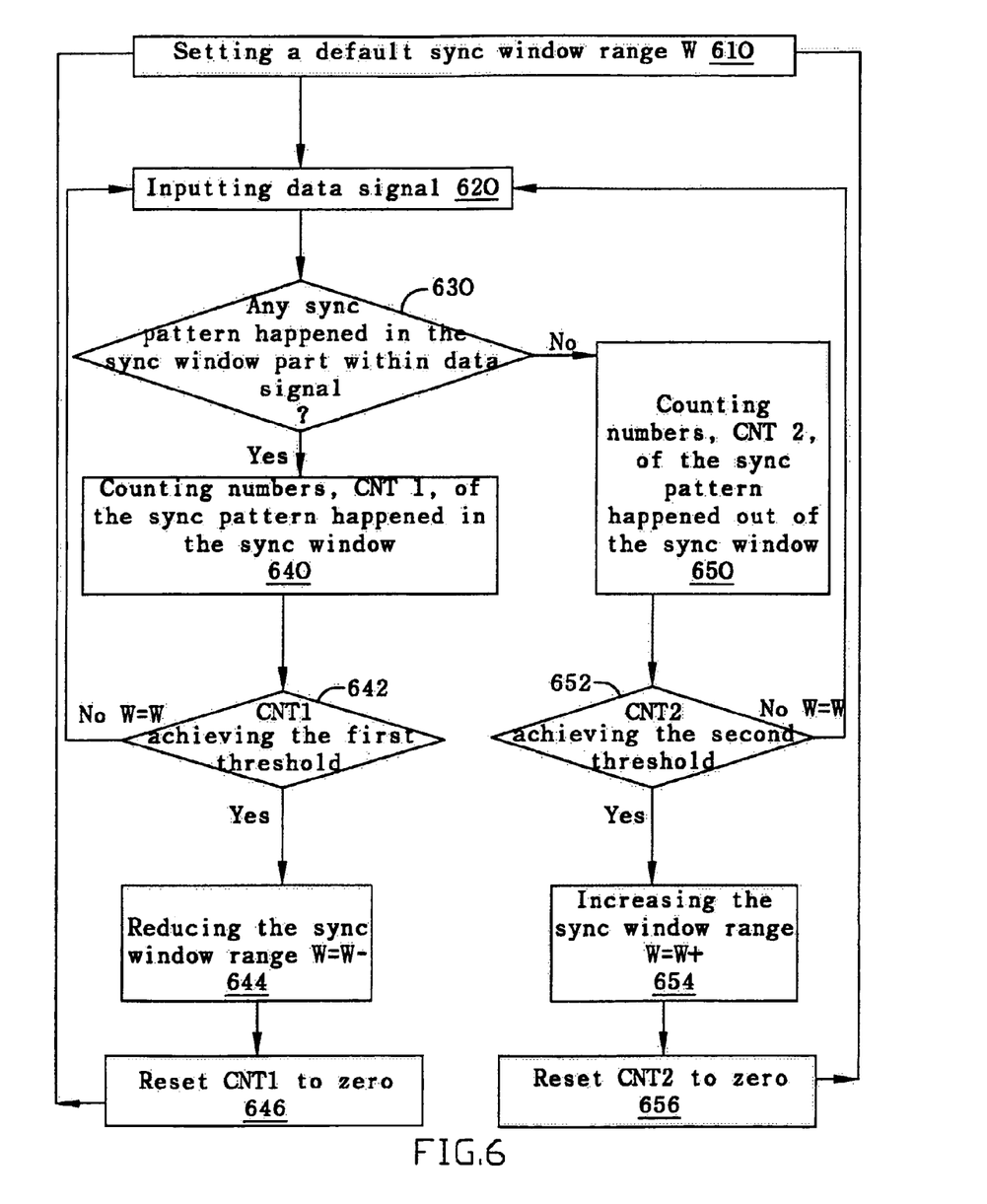
FIG. 6 shows a schematic diagram illustrating the method flow chart of dynamic adjusting the sync window.

The flow chart shows one of the methods of the invention in FIG. 6

610: Setting a default sync window range W
620: Inputting data signal
630: Detecting the data signal part in the sync window whether it exists the sync pattern or not.
  If yes, executing the step 640; if no, executing the step 650.
640: Accumulating the numbers of the sync pattern happened in the sync window
642: Determining the first accumulating value CNT1 whether it achieves the first threshold or not.
  If yes, executing the step 644; if no, executing the step 620.
644: The sync window range W=W−(W− is smaller than the predefined sync window)
646: Reset the first accumulating value CNT1 to zero and return to step 610
650: Accumulating the numbers CNT2 of the sync pattern happened out of the sync window/
652: Determining the second accumulating value CNT2 whether it achieves the second threshold or not.
  If yes, executing step 654; if no, executing step 620.
654: the sync window range W=W+(W+ is bigger than the predefined sync window)
656: Reset the second accumulating value CNT2 to zero and return to step 610

Figure 7:
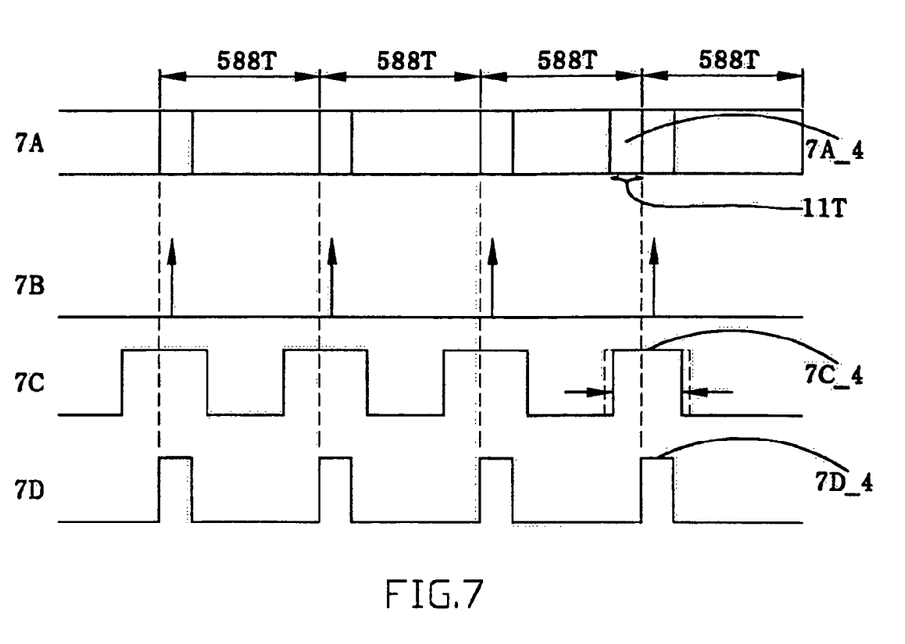
FIG. 7 shows a schematic diagram illustrating the timing sequence of dynamic adjusting the sync window.

FIG. 7 shows an example for an optical drive searching the sync pattern of an optical disk. The symbol 7A shows some frames signal of an optical disc and 7B is the sync found generated by the optical drive. For a compact disc (CD), the sync pattern should be formed as 11T/11T However, when the CD has scraped or stained, it generates 11T/11T/11T signal (as shown in 7A_4). In the predefined sync window range, the sync pattern occurs twice and the threshold is achieved (suppose the threshold is 2). Therefore reducing the sync window range (as shown in 7C_4) and the system can determine the correct sync pattern (as shown in 7D_4). As the result, the optical drive can find every sync pattern of the frame and it further can read the correct data signal on the disc.

By comparing the method of detecting the sync pattern in a normal optical drive, the invention provides a method and apparatus for a dynamic adjusting sync window. When a disc error signal occurs, the optical drive can still find the correct sync pattern of every frame.

As previous said, the invention, depending on the conditions adjusts the sync window range of the optical drive. When analogy sync pattern continuously occurs, the optical drive adaptively reduces the sync window so as to find the correct sync pattern. Otherwise, when the optical drive cannot find the sync pattern in the sync window, it can adaptively increase the sync window range so as to find the sync pattern.

Although the invention discloses the example as optical drive herein, it is not limit the spirit of the invention. The invention also covers that other embodiments disclose storing media with sync pattern detecting. It is intended that the specification and examples to be considered as exemplary only, with a true scope and spirit of the invention being indicated by the following claims.

What is claimed is:

1. A method of dynamically adjusting a sync window of an optical disk device, comprising:
setting a default sync window to a finite value that is greater than a default sync pattern;
inputting a data signal based on data read from an optical disk, the data signal including an incorrect sync pattern portion and a correct sync pattern portion;
determining if a sync pattern of the data signal occurs in the sync window;
if the sync pattern of the data signal occurs in the sync window, increasing a first counter without resetting a second counter;
if the sync pattern of the data signal occurs out of the sync window, increasing the second counter without resetting the first counter;
if the first counter achieves a first threshold:
reducing the sync window; and
resetting the first counter;
if the second counter achieves a second threshold:
increasing the sync window; and
resetting the second counter,
so that the sync window includes the correct sync pattern portion of the data signal but not the incorrect sync pattern portion.

2. The method according to claim 1, wherein a range of the sync window is not smaller than the sync pattern, and wherein if the sync pattern of the data signal occurs in the sync window, increasing the first counter without resetting the second counter.

3. The method according to claim 1, wherein the optical disc is one of CD-ROM, CD-RW, DVD-ROM, DVD-RW, and DVD+RW.

4. The method according to claim 3, wherein the sync pattern is 11T/11T if the optical disc is CD-ROM.

5. The method according to claim 3, wherein the sync pattern is 14T/4T if the optical disc is DVD-ROM.

6. An apparatus for dynamically adjusting a sync window of an optical disk device, comprising:
a buffer for storing a data signal, the data signal based on data from an optical disk and including a correct sync pattern portion and an incorrect sync pattern portion;
a sync window generator for generating a sync window of a finite range;
a sync pattern detection circuit connected to the buffer and the sync window generator for detecting a sync pattern of the data signal;
a first counter connected to the sync pattern detection circuit for accumulating numbers of the sync pattern occurring in the sync window;
a second counter connected to the sync pattern detection circuit for accumulating numbers of the sync pattern occurring out of the sync window, wherein the apparatus is configured such that the first counter is not reset when the second counter is incremented and the second counter is not reset when the first counter is incremented; and
an adjusting circuit connected to the sync window generator, the first counter, and the second counter and for adjusting a sync window range, based on counter values of the first and second counter, to be a sync window for detecting the next input data signal wherein the sync window range includes the correct sync pattern portion and excludes the incorrect sync pattern portion.

7. The method according to claim 6, wherein if the first counter achieves a first threshold, the adjusting circuit reduces the sync window for detecting the next data signal.

8. The method according to claim 6, wherein if the second counter achieves a second threshold, the adjusting circuit increase the sync window for detecting the next data signal.

9. The method according to claim 6, wherein the apparatus is applied in an optical drive.

10. The method according to claim 9, wherein the optical drive comprises one of CD-ROM, CD-RW, DVD-ROM, DVD-RW and DVD+RW.

11. The method according to claim 10, wherein if the optical drive is CD-ROM, the sync pattern is 11T/11T.

12. The method according to claim 10, wherein if the optical drive is DVD-ROM, the sync pattern is 14T/4T.

13. The method according to claim 6, wherein the capacity of the buffer is the length of the sync pattern.

14. An apparatus for dynamically adjusting a sync window of an optical disk device, comprising:
a buffer that is configured to store a data signal, the data signal based on data from an optical disk and including a correct sync pattern portion and an incorrect sync pattern portion;
a sync window generator that is configured to generate a sync window having a finite range;
a sync pattern detection circuit connected to the buffer and the sync window generator that is configured to detect a sync pattern of the data signal;
a first counter connected to the sync pattern detection circuit that is configured to accumulate a count of the sync pattern occurring in the sync window;
a second counter connected to the sync pattern detection circuit that is configured to accumulate a count of the sync pattern occurring out of the sync window and is further configured such that the first counter is not reset when the second counter is incremented and the second counter is not reset when the first counter is incremented; and
an adjusting circuit connected to the sync window generator, the first counter, and the second counter and that is configured to adjust the range of the sync window based on the accumulated counts of the first and the second counter so that the adjusted range includes the correct sync pattern portion and excludes the incorrect sync pattern portion.

15. The apparatus of claim 14, wherein the range of the sync window is not smaller than the sync pattern, wherein the first counter is further configured to be increased if the sync pattern of the data signal occurs in the sync window, the second counter is further configured to not be reset if the sync pattern of the data signal occurs in the sync window, the second counter is further configured to be increased if the sync pattern of the data signal occurs out of the sync window, and the first counter is further configured to not be reset if the sync pattern of the data signal occurs out of the sync window.

16. The apparatus of claim 14, wherein the sync pattern is 11T/11T if the optical disc is a CD-ROM, and wherein the sync pattern is 14T/4T if the optical disc is a DVD-ROM.

17. The apparatus of claim 14, wherein the adjusting circuit is further configured to adjust the range of the sync window based on accumulated counts of the first counter and the second counter, wherein the accumulated count of the first counter is relative to a first threshold, and wherein the accumulated count of the second counter is relative to a second threshold.

* * * * *